US012299051B2

(12) United States Patent
Puzicha et al.

(10) Patent No.: US 12,299,051 B2
(45) Date of Patent: *May 13, 2025

(54) SYSTEMS AND METHODS OF PREDICTIVE FILTERING USING DOCUMENT FIELD VALUES

(71) Applicant: Open Text Holdings, Inc., Wilmington, DE (US)

(72) Inventors: Jan Puzicha, Bonn (DE); Joe Federline, Mansfield, MA (US)

(73) Assignee: Open Text Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/151,031

(22) Filed: Jan. 15, 2021

(65) Prior Publication Data

US 2021/0133255 A1 May 6, 2021

Related U.S. Application Data

(63) Continuation of application No. 16/042,293, filed on Jul. 23, 2018, now Pat. No. 10,902,066.

(51) Int. Cl.
*G06F 16/93* (2019.01)
*G06F 16/23* (2019.01)
*G06F 16/38* (2019.01)

(52) U.S. Cl.
CPC .............. *G06F 16/93* (2019.01); *G06F 16/23* (2019.01); *G06F 16/38* (2019.01)

(58) Field of Classification Search
CPC ...................................................... G06F 16/38
See application file for complete search history.

(56) References Cited

U.S. PATENT DOCUMENTS 4,839,853 A 6/1989 Deerwester et al.
6,687,696 B2 2/2004 Hofmann et al.
(Continued)

FOREIGN PATENT DOCUMENTS

EP 2718803 A1 4/2014
WO WO2012170048 A1 12/2012

OTHER PUBLICATIONS

Joachims, Thorsten, "Transductive Inference for Text Classification Using Support Vector Machines", Proceedings of the Sixteenth International Conference on Machine Learning, 1999, 10 pages.
(Continued)

*Primary Examiner* — Brittany N Allen
(74) *Attorney, Agent, or Firm* — Carr & Ferrell LLP (57) ABSTRACT

Electronic discovery using predictive filtering is disclosed herein. An example method includes providing a filtering interface that includes a field value input, a predicted values selector, and a predictor type selector; receiving at least a pivot selected from the field value input and a predicted value from the predicted values selector; searching a plurality of documents based on the pivot and the predicted value selected for any of predictive phrases or predictive concepts; calculating a predictive value for each of the predictive phrases or predictive concepts; and generating a graphical user interface that includes the predictive phrases or predictive concepts in conjunction with their respective predictive value.

26 Claims, 7 Drawing Sheets

(56) References Cited

U.S. PATENT DOCUMENTS

| | | | |
|---|---|---|---|
| 7,051,017 B2 | 5/2006 | Marchisio | |
| 7,089,238 B1 | 8/2006 | Davis et al. | |
| 7,107,266 B1 | 9/2006 | Breyman et al. | |
| 7,328,216 B2 | 2/2008 | Hofmann et al. | |
| 7,376,635 B1 | 5/2008 | Porcari et al. | |
| 7,428,541 B2 | 9/2008 | Houle | |
| 7,454,407 B2 | 11/2008 | Chaudhuri et al. | |
| 7,519,589 B2 | 4/2009 | Charnock et al. | |
| 7,558,778 B2 | 7/2009 | Carus et al. | |
| 7,657,522 B1 | 2/2010 | Puzicha et al. | |
| 7,933,859 B1 | 4/2011 | Puzicha et al. | |
| 7,945,600 B1 | 5/2011 | Thomas et al. | |
| 8,015,124 B2 | 9/2011 | Milo | |
| 8,196,030 B1 | 6/2012 | Wang et al. | |
| 8,250,008 B1 | 8/2012 | Cao et al. | |
| 8,296,309 B2 | 10/2012 | Brassil et al. | |
| 8,433,705 B1 * | 4/2013 | Dredze | G06F 16/24578 |
| | | | 707/723 |
| 8,489,538 B1 | 7/2013 | Puzicha et al. | |
| 8,527,523 B1 | 9/2013 | Ravid | |
| 8,554,716 B1 | 10/2013 | Puzicha et al. | |
| 8,577,866 B1 | 11/2013 | Osinga et al. | |
| 8,620,842 B1 | 12/2013 | Cormack | |
| 9,058,327 B1 | 6/2015 | Lehrman et al. | |
| 9,223,858 B1 | 12/2015 | Gummaregula et al. | |
| 9,269,053 B2 | 2/2016 | Naslund et al. | |
| 9,558,265 B1 * | 1/2017 | Tacchi | G06F 16/338 |
| 9,595,005 B1 | 3/2017 | Puzicha et al. | |
| 9,607,272 B1 | 3/2017 | Yu | |
| 9,785,634 B2 | 10/2017 | Puzicha | |
| 10,062,039 B1 | 8/2018 | Lockett | |
| 10,691,760 B2 * | 6/2020 | Pattabiraman | G06F 16/24578 |
| 10,902,066 B2 | 1/2021 | Puzicha et al. | |
| 11,023,828 B2 | 6/2021 | Puzicha et al. | |
| 11,282,000 B2 | 3/2022 | Puzicha et al. | |
| 2001/0037324 A1 | 11/2001 | Agrawal et al. | |
| 2002/0032564 A1 | 3/2002 | Ehsani et al. | |
| 2002/0080170 A1 | 6/2002 | Goldberg et al. | |
| 2002/0164070 A1 | 11/2002 | Kuhner et al. | |
| 2003/0120653 A1 | 6/2003 | Brady et al. | |
| 2003/0135818 A1 | 7/2003 | Goodwin et al. | |
| 2004/0167877 A1 | 8/2004 | Thompson, III | |
| 2004/0210834 A1 | 10/2004 | Duncan et al. | |
| 2005/0021397 A1 | 1/2005 | Cui et al. | |
| 2005/0027664 A1 | 2/2005 | Johnson et al. | |
| 2005/0262039 A1 | 11/2005 | Kreulen et al. | |
| 2006/0020571 A1 * | 1/2006 | Patterson | G06F 16/335 |
| 2006/0161423 A1 * | 7/2006 | Scott | G06F 16/353 |
| | | | 707/E17.09 |
| 2006/0242190 A1 | 10/2006 | Wnek | |
| 2006/0259475 A1 * | 11/2006 | Dehlinger | G06F 16/93 |
| 2006/0294101 A1 | 12/2006 | Wnek | |
| 2007/0226211 A1 | 9/2007 | Heinze et al. | |
| 2008/0086433 A1 | 4/2008 | Schmidtler et al. | |
| 2009/0012984 A1 | 1/2009 | Ravid et al. | |
| 2009/0043797 A1 | 2/2009 | Dorie et al. | |
| 2009/0083200 A1 | 3/2009 | Pollara et al. | |
| 2009/0106239 A1 | 4/2009 | Getner et al. | |
| 2009/0119343 A1 | 5/2009 | Jiao et al. | |
| 2009/0164416 A1 | 6/2009 | Guha | |
| 2009/0306933 A1 | 12/2009 | Chan et al. | |
| 2010/0014762 A1 | 1/2010 | Renders et al. | |
| 2010/0030798 A1 | 2/2010 | Kumar et al. | |
| 2010/0097634 A1 | 4/2010 | Meyers et al. | |
| 2010/0118025 A1 | 5/2010 | Smith et al. | |
| 2010/0250474 A1 | 9/2010 | Richards et al. | |
| 2010/0250541 A1 | 9/2010 | Richards et al. | |
| 2010/0293117 A1 | 11/2010 | Xu | |
| 2010/0312725 A1 | 12/2010 | Privault et al. | |
| 2010/0325102 A1 | 12/2010 | Maze | |
| 2011/0023034 A1 | 1/2011 | Nelson et al. | |
| 2011/0029536 A1 | 2/2011 | Knight et al. | |
| 2011/0047156 A1 | 2/2011 | Knight et al. | |
| 2011/0135209 A1 | 6/2011 | Oba | |
| 2012/0101965 A1 | 4/2012 | Hennig et al. | |
| 2012/0191708 A1 | 7/2012 | Barsony et al. | |
| 2012/0278266 A1 | 11/2012 | Naslund et al. | |
| 2012/0296891 A1 | 11/2012 | Rangan | |
| 2012/0310930 A1 | 12/2012 | Kumar et al. | |
| 2012/0310935 A1 | 12/2012 | Puzicha | |
| 2013/0006996 A1 | 1/2013 | Kadarkarai | |
| 2013/0124552 A1 | 5/2013 | Stevenson et al. | |
| 2013/0132394 A1 | 5/2013 | Puzicha | |
| 2014/0059038 A1 | 2/2014 | McPherson et al. | |
| 2014/0059069 A1 | 2/2014 | Taft et al. | |
| 2014/0156567 A1 | 6/2014 | Scholtes | |
| 2014/0207786 A1 | 7/2014 | Tal-Rothschild et al. | |
| 2014/0310588 A1 | 10/2014 | Bhogal et al. | |
| 2015/0347576 A1 * | 12/2015 | Endert | G06F 16/3323 |
| | | | 707/724 |
| 2016/0019282 A1 | 1/2016 | Lewis et al. | |
| 2016/0110826 A1 | 4/2016 | Morimoto et al. | |
| 2017/0132530 A1 | 5/2017 | Puzicha et al. | |
| 2017/0270115 A1 | 9/2017 | Cormack et al. | |
| 2017/0322931 A1 | 11/2017 | Puzicha | |
| 2018/0121831 A1 | 5/2018 | Puzicha et al. | |
| 2018/0341875 A1 | 11/2018 | Carr | |
| 2019/0138615 A1 | 5/2019 | Huh et al. | |
| 2019/0205400 A1 | 7/2019 | Puzicha | |
| 2019/0325031 A1 | 10/2019 | Puzicha | |
| 2020/0005218 A1 * | 1/2020 | Cheung | G06F 16/248 |
| 2020/0026768 A1 | 1/2020 | Puzicha et al. | |
| 2021/0216915 A1 | 7/2021 | Puzicha et al. | |
| 2021/0224693 A1 | 7/2021 | Puzicha et al. | |
| 2021/0224694 A1 | 7/2021 | Puzicha et al. | |
| 2022/0036244 A1 | 2/2022 | Puzicha et al. | |
| 2022/0188708 A1 | 6/2022 | Puzicha et al. | |

OTHER PUBLICATIONS

Webber et al. "Assessor Error in Stratified Evaluation," Proceedings of the 19th ACM International Conference on Information and Knowledge Management, 2010. p. 539-548. [Accessed Jun. 2, 2011—ACM Digital Library] http:// portal.acm.org/citation.cfm?doid=1871437.1871508.

Webber et al. "Score Adjustment for Correction of Pooling Bias," Proceedings of the 32nd international ACM SIGIR conference on Research and development in information retrieval, 2009. p. 444-451. [Accessed Jun. 2, 2011—ACM Digital Library] http://portal.acm.org/citation.cfm?doid=1571941.1572018.

Buckley et al. "Bias and the Limits of Pooling for Large Collections," Journal of Information Retrieval, Dec. 2007. vol. 10, No. 6, pp. 1-16 [Accessed Jun. 2, 2011—Google, via ACM Digital Library] http://www.cs.umbc.edu/~ian/pubs/irj-titlestat-final.pdf.

Carpenter, "E-Discovery: Predictive Tagging To Reduce Cost and Error", The Metropolitan Corporate Counsel, 2009, p. 40.

Zad et al. "Collaborative Movie Annotation", Handbook of Multimedia for Digital Entertainment and Arts, 2009, pp. 265-288.

"Extended European Search Report", European Patent Application No. 11867283.1, Feb. 24, 2015, 6 pages.

"Axcelerate 5 Case Manager Guide", Recommind, Inc., [online], 2016 [retrieved Aug. 12, 2020], retrieved from the Internet: <URL: http://axcelerate-docs.opentext.com/help/axc-main/5.15/en_us/content/resources/pdf%20guides/axcelerate_5_7_case_manager_user_guide.pdf>, 198 pages.

"Axcelerate 5 Reviewer User Guide", Recommind, Inc., [online], 2016 [retrieved Aug. 12, 2020], retrieved from the Internet: <URL: http://axcelerate-docs.opentext.com/help/axc-main/5.15/en_us/content/resources/pdf%20guides/axcelerate_5_7_reviewer_user_guide.pdf>, 36 pages.

"Discovery-Assistant—Near Duplicates", ImageMAKER Development Inc. [online], 2010, [retrieved Aug. 12, 2020], retrieved from the Internet: <URL:www.discovery-assistant.com > Download > Near-Duplicates.pdf>, 14 pages.

Doherty, Sean, "Recornrmind's Axcelerate: An E-Discovery Speedway", Legal Technology News, 20 Septernber 2014, 3 pages.

Youtube, "Introduction to Axcelerate 5", OpenText Discovery, [online], uploaded Apr. 17, 2014, [retrieved Jul. 10, 2020], retrieved from the Internet: <URL:www.youtube.com/watch?v=KBzbZL9Uxyw>, 41 pages.

(56) References Cited

OTHER PUBLICATIONS

"Axcelerate 5.9.0 Release Notes", Recommind, Inc., [online], Aug. 17, 2016 [retrieved Aug. 12, 2020], retrieved from the Internet: <URL: http://axcelerate-docs.opentext.com/help/axc-user/5.9/en_us/content/resources/pdf%20guides/axcelerate%205.9.0%20release%20notes.pdf>, 46 pages.

"Axcelerate 5.7.2 Release Notes", Recommind, Inc., [online], Mar. 3, 2016 [retrieved Aug. 12, 2020], retrieved from the Internet: <URL: http://axcelerate-docs.opentext.com/help/axc-user/5.9/en_us/content/resources/pdf%20guides/axcelerate%205.7.2%20release%20notes.pdf>, 7 pages.

* cited by examiner

SYSTEMS AND METHODS OF PREDICTIVE FILTERING USING DOCUMENT FIELD VALUES

CROSS-REFERENCE TO RELATED APPLICATION

This application is a continuation of and claims the priority benefit of U.S. patent application Ser. No. 16/042,293 filed on Jul. 23, 2018, entitled "ELECTRONIC DISCOVERY USING PREDICTIVE FILTERING," which is incorporated herein by reference in its entirety.

FIELD

The present disclosure is directed to systems and methods that provide electronic discovery, and more specifically but not by limitation, to electronic discovery systems and methods that provide predictive filtering of documents using automatically suggested filter values based on predictive modeling, including but not limited to responsive phrases, concepts and other identified meta-data for documents.

SUMMARY

According to various embodiments, the present technology is directed to a method comprising: receiving a selection of a pivot, the pivot being a field value or a set of field values; searching a plurality of documents based on the pivot for any of predictive phrases or predictive concepts or other identified predictive meta-data; calculating a predictive value for each of the predictive phrases or predictive concepts or other predictive meta-data; generating a graphical user interface that comprises automatically generated filter criteria based on the predictive value for each of the predictive phrases or predictive concepts or other predictive meta-data; receiving a selection of at least one of the automatically generated filter criteria from the graphical user interface; building and applying a filter based on the selection; and displaying within the graphical user interface, documents from the plurality of documents that were selected using the filter.

According to various embodiments, the present technology is directed to a method comprising: a processor; and a memory for storing executable instructions, the processor executing the instructions to: receive a selection of a pivot, the pivot being a field value or a set of field values; search a plurality of documents based on the pivot for any of predictive phrases or predictive concepts or other predictive meta-data; calculate a predictive value for each of the predictive phrases or predictive concepts or other predictive meta-data; and generate a graphical user interface that comprises the predictive phrases or predictive concepts or other predictive meta-data in conjunction with their respective predictive value.

According to various embodiments, the present technology is directed to a system comprising: providing a filtering interface that comprises a field value input, a predicted values selector, and a predictor type selector; receiving at least a pivot selected from the field value input and a predicted value from the predicted values selector; searching a plurality of documents based on the pivot and the predicted value selected for any of predictive phrases or predictive concepts or other predictive meta-data; calculating a predictive value for each of the predictive phrases or predictive concepts or other predictive meta-data; and generating a graphical user interface that comprises the predictive phrases or predictive concepts or other predictive meta-data in conjunction with their respective predictive value.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

The present disclosure relates generally to systems and methods that provide predictive filtering within electronic discovery review systems. For context, technical problems arise within electronic discovery systems when documents are voluminous in amount and reviewers cannot review each of the documents. For example, some discovery processes involve hundreds of thousands if not millions of documents. These documents can include electronic documents that have been previously coded (e.g., tagged) with metadata through either manual hard coding or automated coding (e.g., predictive coding). These documents can include electronic documents such as emails or electronic representations of hard copy documents (e.g., physical media) such as paper communications that have been converted into electronic format. Thus, a problem exists that reviewers need to have access to relevant/responsive documents early in the review process in order to avoid having to review non-responsive or irrelevant documents. It is impossible or not feasible to facilitate predictive analysis of tagged documents using human review as this does not solve the problem at hand.

Furthermore, although these documents have been coded/tagged, the significance of these documents to reviewers can be difficult to determine without further review or some context. For example, while a plurality of documents may be tagged as "relevant" for a particular lawsuit, this indication in itself is not indicative of why the documents were determined to be relevant.

In order to remedy these technical problems, the systems and methods herein are configured to determine and suggest automated filter values that can be applied in response to a selected pivot (e.g., filter value or set of filter values) in order to locate documents that are responsive to the selected pivot. Interfaces for selecting pivots and automated filter values, as well as building customized filters are provided herein. The interfaces are provided within an electronic document review system so that the reviewer is provided with a list of responsive documents for electronic review. These systems and methods are configured to determine the predictiveness of features inside a document in order to quantify or explain the relevancy/responsiveness of the document to the reviewer. These and other advantages of the present disclosure are described herein with reference to the collective drawings.

FIGS. 1-4 collectively illustrate screenshots of example graphical user interfaces (GUI) generated by an example predictive filtering system configured in accordance with embodiments of the present disclosure. It will be understood that the example predictive filtering systems discussed herein comprise a specific purpose computing device. In one example, the predictive filtering system comprises all or portions of the example computer system of FIG. 7 that have been specifically configured to perform automated methods of predictive filtering.

Figure 1:
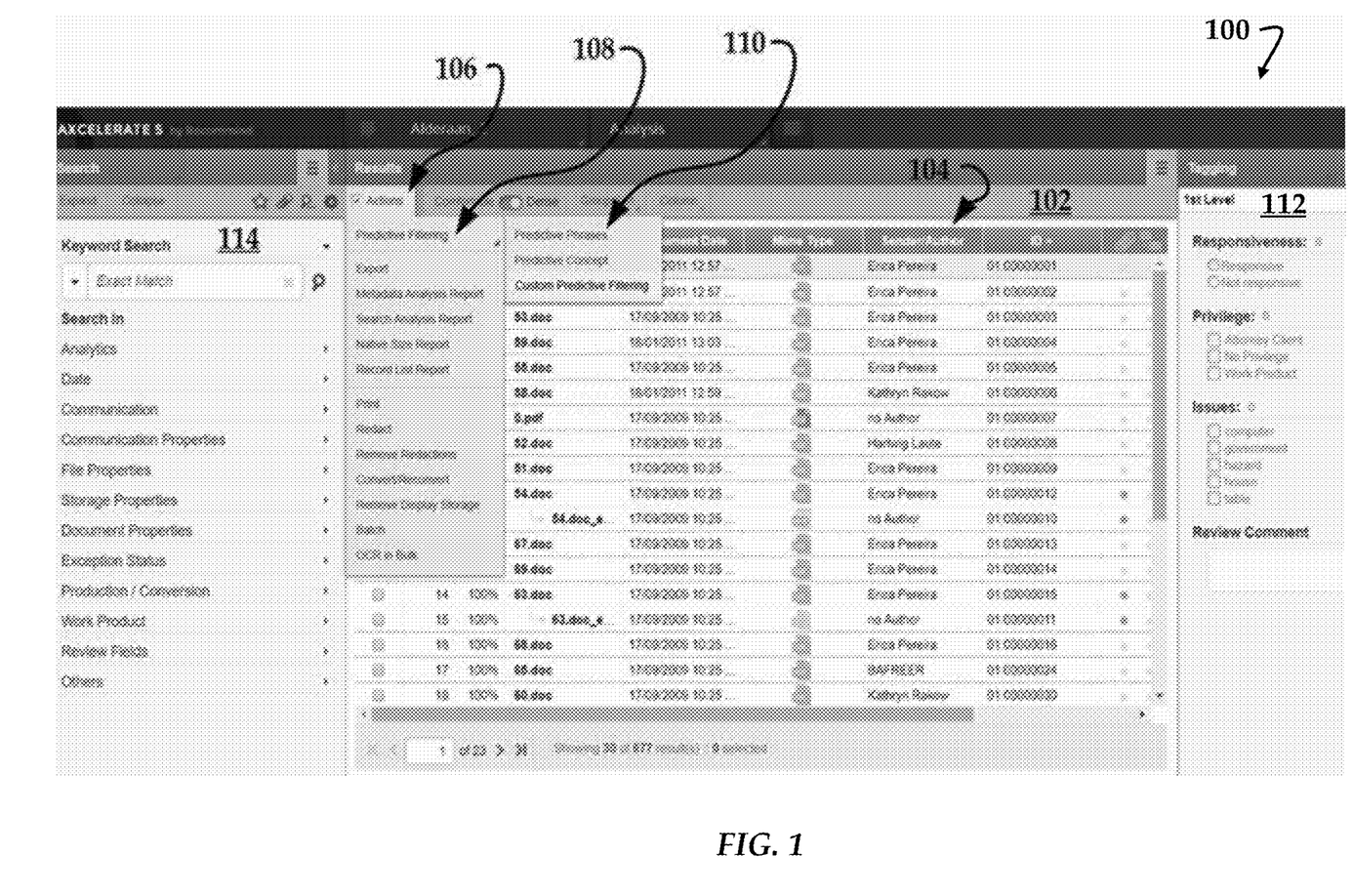
FIG. 1 is an example graphical user interface of the present disclosure configured to allow a reviewer to specify a predictive filtering type and view associated documents.

In FIG. 1, a GUI 100 is illustrated that includes an electronic discovery document review interface. In some embodiments, the GUI 100 comprises a frame 102 that provides a list of electronic documents 104 available for review. The GUI 100 comprises a selectable menu 106 that includes a predictive filtering option 108. When selected, the predictive filtering option 108 provides a selectable submenu 110 that includes a plurality of selectable options. In some embodiments, the plurality of selectable options includes predictive phrases, predictive concept, and custom predictive filtering options.

In more detail, the aspects of predictive phrases and predictive concept are referred to throughout as a predictor type. Selection of the predictive phrases predictor type configures the predictive filtering system to search a corpus of electronic documents for key noun phrases. In general, a noun phrase includes a sequence of words in an electronic document that is repeatedly found within the electronic document or across more than one document. Noun phrases are being extracted using statistical machine learning, but for the purpose of predictive filtering can be viewed as metadata associated with each document. Additional detail on frequency (e.g., counts) and predictiveness is provided in greater detail infra.

Selection of the predictive concept predictor type configures the predictive filtering system to search a corpus of electronic documents for specific concepts rather than keywords or phrases. Similar to noun phrases, concepts can be viewed as meta-data for the documents that is automatically extracted using machine learning methods such as probabilistic latent semantic analysis (PLSA) or Latent Dirichlet Analysis (LDA). It will be understood that predictive filtering is designed to work with any meta-data of the document. Phrases and concepts represent two common use cases for predictive filtering.

Tagging applied to a specific document is illustrated specific detail in panel 112. The reviewer can also update the tagging of a specific document using the options in panel 112. In some instances, the GUI 100 can include a search function 114 that allows a reviewer to search for documents ad hoc using various keywords/phrases.

Figure 2:
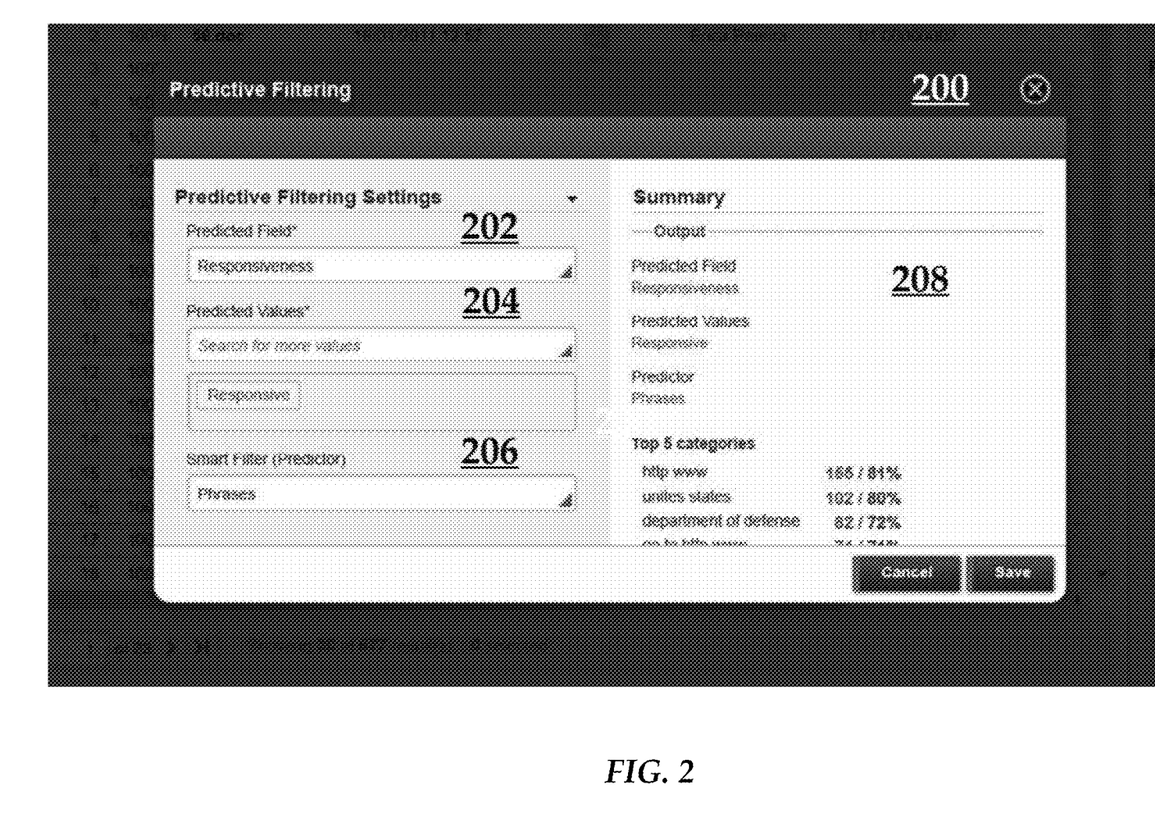
FIG. 2 is an example graphical user interface of a filtering interface that allows a reviewer to create a customized predictive filter.

In various embodiments, reviewers can utilize the custom predictive filtering option to create their own unique predictive filter. An example of a custom predictive filter creation interface (e.g., filtering interface) is illustrated and described with reference to FIG. 2. In more detail, the GUI 200 of FIG. 2 is a filtering interface that allows a reviewer to create a custom predictive filter. The GUI 200 includes a panel that comprises a field value input 202, a predicted values selector 204, and a predictor type selector 206. The GUI 200 also includes a preview frame 208.

In some embodiments, the field value input 202 comprises a dropdown box that includes a selectable list of predicted field values such as responsiveness, hot, issue code, or any other metadata category used to define at least one parameter or attribute of a document. The metadata category is sometimes referred to as taxonomy.

In this example, the "responsiveness" field value is selected automatically by the predictive filtering system. A selection of the responsiveness field value causes the predictive filtering system to evaluate documents that have been previously tagged as being responsive for the current case. For example, documents are considered responsive within the context of one or multiple issue within a lawsuit. Generally speaking, the field value or set of field values selected is referred to as a pivot. While the field values described herein can be used as a pivot, other content can be used as a pivot as well.

In some embodiments, a keyword or key phrase located by the predictive filtering system can be used as input replacing the originally selected field value (pivot) or being used in combination with the originally selected field value. Stated otherwise, an originally selected pivot is updated with the key phrase(s) or concept(s) selected by the reviewer and the predictive filtering system rebuilds the filter. This rebuilt filter can identify additional documents found in a subsequent updated search using this rebuilt filter. In some instances, the additional documents are those included in the original corpus of documents.

In an example where the original pivot was "responsiveness" and a predictive filter results in identification of key phrases such as "united states" as illustrated in the preview frame 208, the key phrase "united states" can be utilized as the pivot to find other keywords or key phrases (or concepts) in the documents. This can result in different content being displayed within the preview frame 208 based on the predictive filtering methods used by the predictive filtering system.

In general, the key phrases identified in the preview frame 208 are selectable filter parameters that can be used by the predictive filtering system to create a filter and return responsive documents that correspond to the filter. Thus, the key phrases identified are automated suggestions of filter criteria that can be used to define how a given filter operates.

The predicted values selector 204 includes a selectable list of options, which in this instance includes "not responsive" and "responsive" as potential options. Thus, while the basic predicted field value type is "responsiveness" there are two options for responsiveness that include either "not responsive" or "responsive". In sum, the predicted values selector can be pre-selected with "responsive categories" rendered as a predictive filter. In some embodiments, this selection is cleared automatically if predicted field is changed by the reviewer.

The predictor type selector 206 allows for a selection of a predictor type such as phrases or concepts as disclosed above. Once the reviewer has completed their selections for the field value input 202, predicted values selector 204, and predictor type selector 206 (also includes pre-selected values in addition to or in lieu of specific reviewer selections), the predictive filtering system performs one or more predictive document analyses (e.g., predictive filtering methods) using the selections in order to generate content within the preview frame 208. Additional details on the predictive filtering methods are provided in greater detail infra.

As illustrated in FIG. 2, the preview frame 208 generally comprises a selection of key phrases found within documents that had been tagged as "responsive" in a prior predictive or manual coding process. This can include a truncated set having the most predictive phrases/concepts found in some instances.

Figure 3:
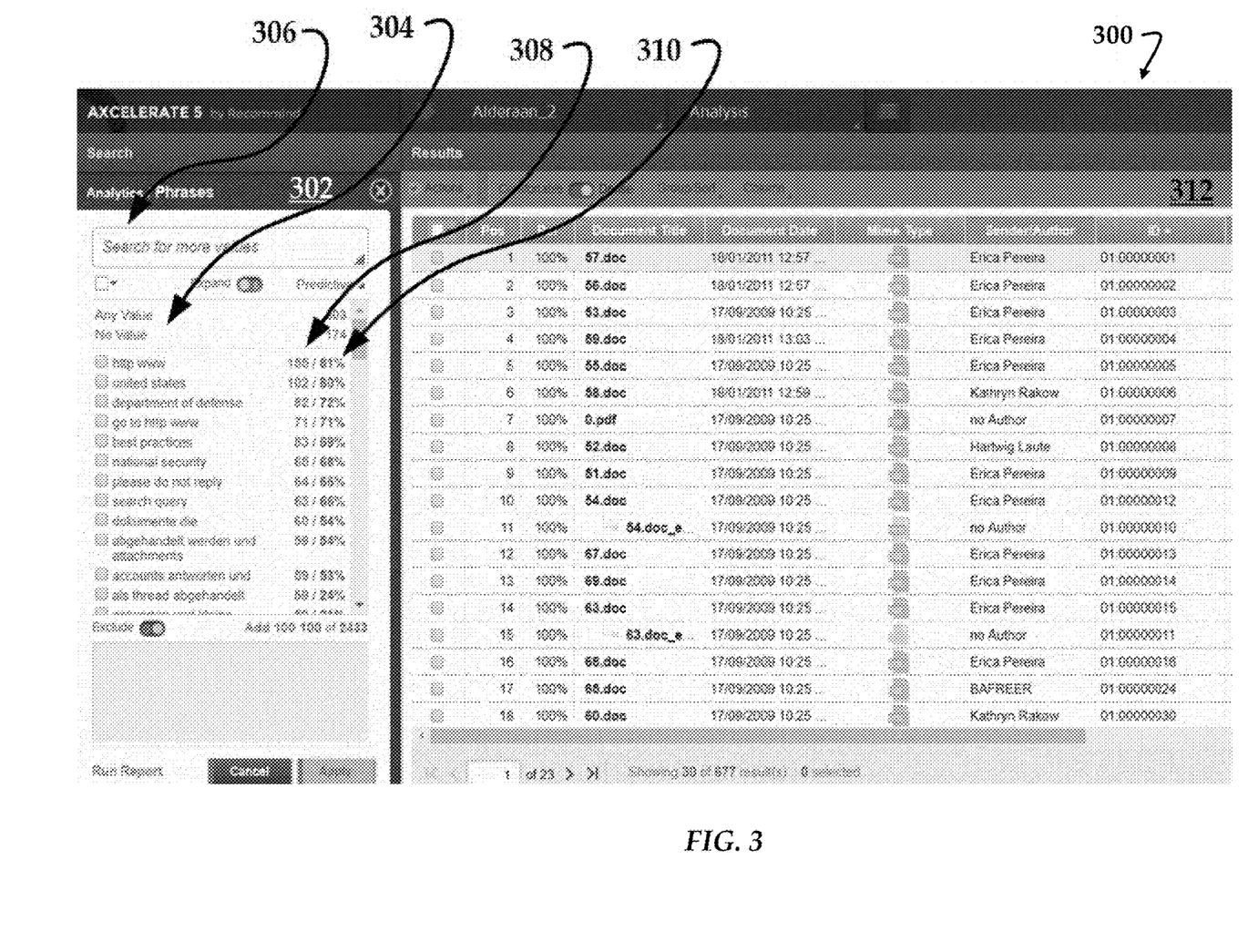
FIG. 3 is an example graphical user interface illustrating predictive values for keywords/phrases or concepts across a corpus of documents selected based on the pivot defined using the GUI of FIG. 1.

FIG. 3 illustrates another example graphical user interface 300 that includes a panel 302 that provides a list 304 of key phrases identified by the predictive filtering system. The panel 302 can also include a search function 306 that allows the reviewer to search for keywords or key phrases that might not be illustrated in the viewable portion of the list 304. Next to each key phrase are two values. The first value is a frequency count value 308 and the second value is a predictiveness score 310. The frequency indicates in how many documents the key phrase appears in. The predictiveness score is indicative of how likely it is that the document is responsive (in general: matches the pivot) if it also includes the key phrase.

Thus, in this example, the key phrase "united states" appears 117 times and is present in 81% of the documents that correspond to a selected pivot such as "responsive." The score range is −100% (indicating that the document is never responsive if it contains the phrase) to 100% (indicating that the document is always responsive if it contains the phrase). A value of 0% indicates that the phrase provides no information about responsiveness of the document. This likelihood is computed based on a universe (all documents or all documents tagged into predicted field taxonomy) by estimating P(responsive|filter value). Additional details on these calculations are provided in greater detail below.

Disposed next to the panel 302 is a document panel 312. The document panel 312 includes a list of documents that correspond to the current search result. When one or multiple of the list 304 of key phrases is selected the list of documents changes in the document panel 312 by filtering the set of documents to only those documents that contain any of the selected phrases.

Figure 4:
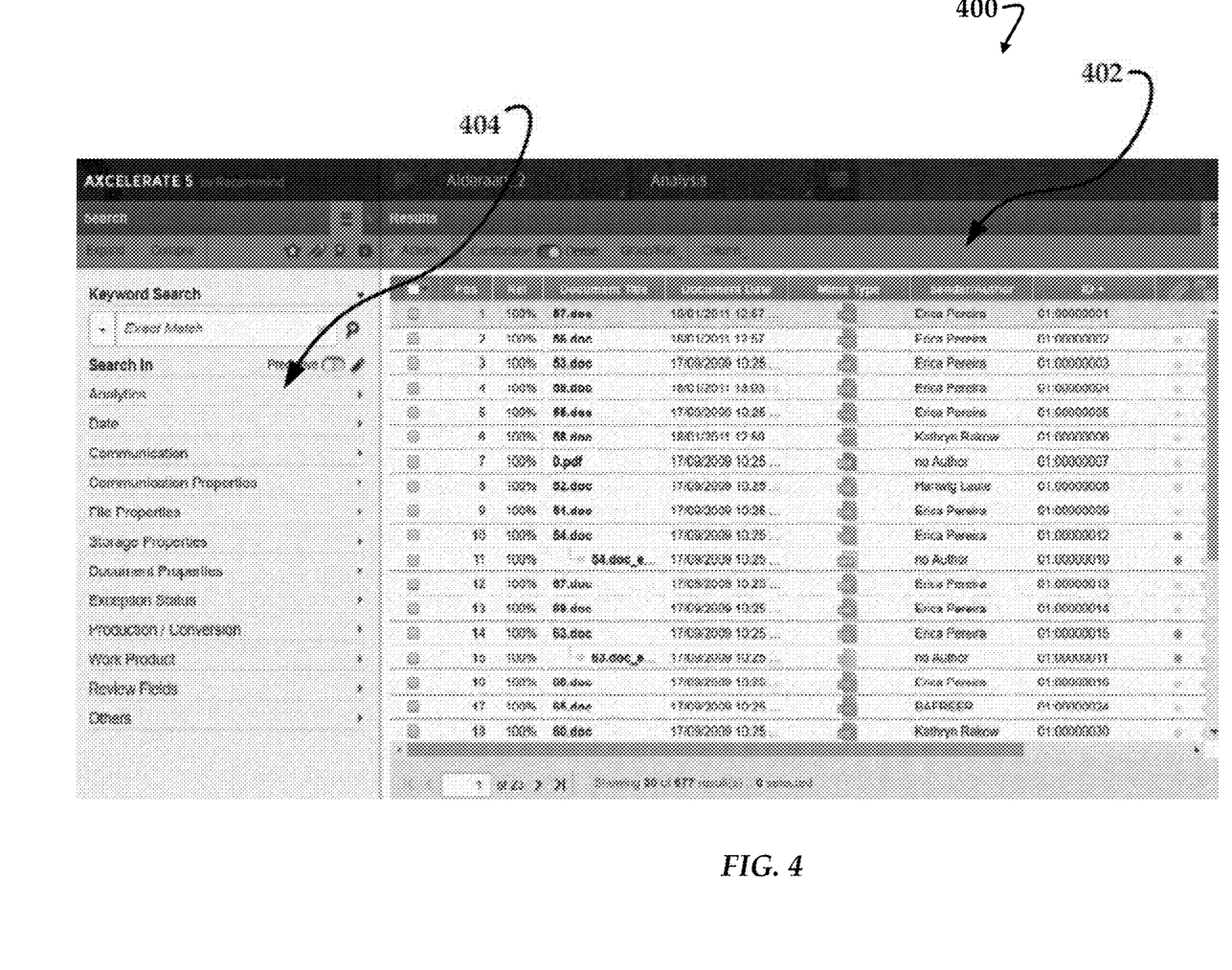
FIG. 4 is an example graphical user interface of the present disclosure configured to allow a reviewer to activate or disable a predictive filter and view associated documents.

FIG. 4 illustrates another example graphical user interface 400 that is provided to a reviewer by the predictive filtering system in instances where no specific predictor value was selected when the reviewer was using the GUI 200 of FIG. 2, or if the GUI 200 is closed without the reviewer selecting any filter values—otherwise these are added as a search criteria. The GUI 400 includes a list 402 of documents that correspond to the current search result.

A current filtering criteria panel 404 allows the reviewer to refine the automatic, predictive filtering. In this example the predictive filtering automatically excludes all documents that have been tagged by the pivot "responsiveness" and "not responsive."

As mentioned above, the predictive filtering systems of the present disclosure are configured to perform one or more types of predictive filtering methods (e.g., algorithms) in order to identify predictive phrases and/or predictive concepts as well as the underlying documents corresponding thereto.

Figure 5:
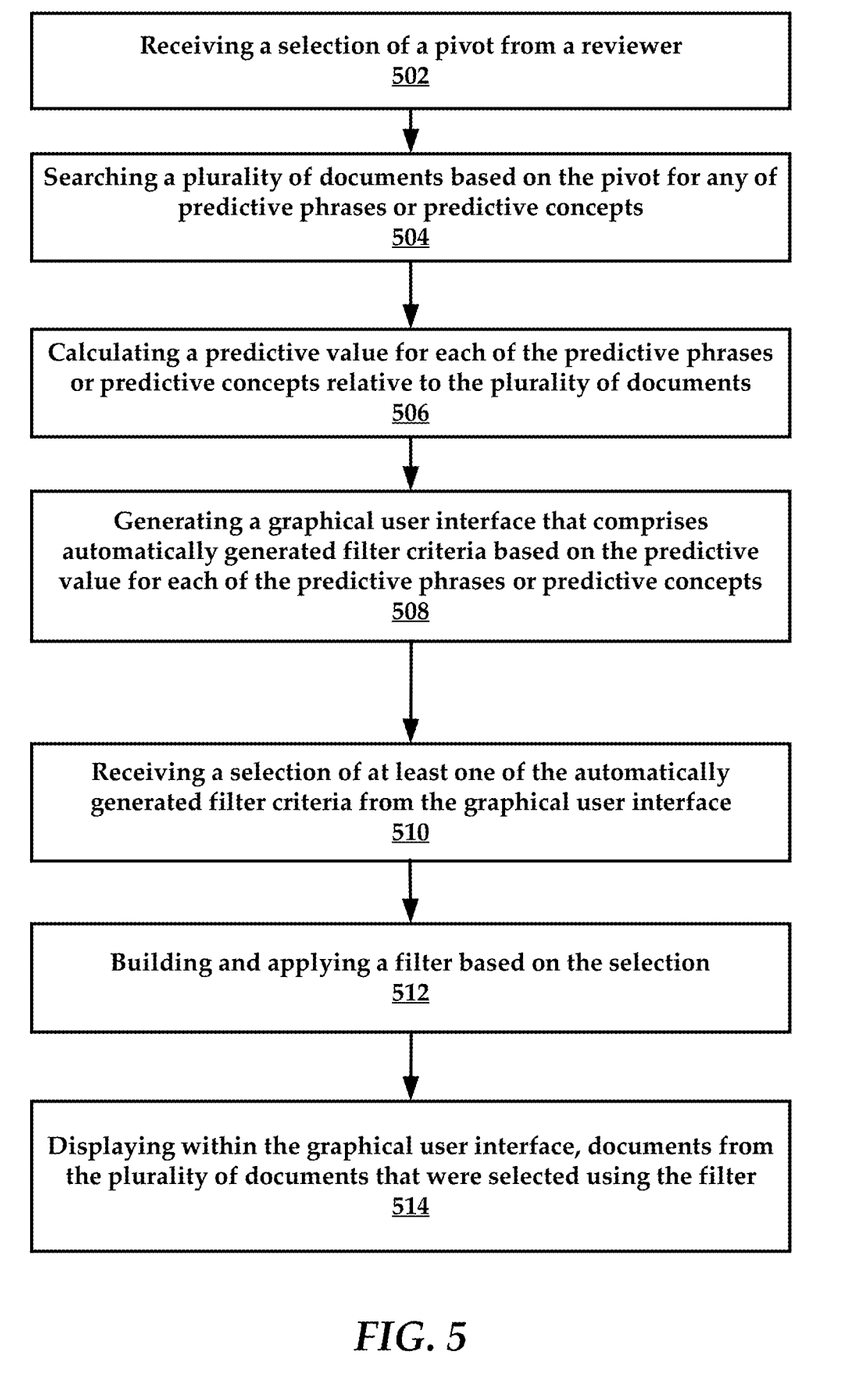
FIG. 5 is a flowchart of an example method for predictive filtering in accordance with the present disclosure.

FIG. 5 is a flowchart of an example predictive filtering method of the present disclosure. The method includes a step 502 of receiving a selection of a pivot from a reviewer. Again, the pivot is a field value such as "responsiveness" or other criteria that is indicative of a metadata tag for one or more documents in a corpus. The pivot can include any metadata tag/field value for a coded document.

In some embodiments, given a specific tagging field (e.g., pivot) a similarity score is computed against manual documents, such as documents that have been tagged before. Tagging fields refer to fields that can be interactively assigned to documents by reviewers (e.g., responsiveness, issues, etc.). For regular fields a similarity score is computed against all documents in a universe, such as all active documents in collection.

Next, the method includes a step 504 of searching a plurality of documents based on the pivot for any of predictive phrases or predictive concepts. In an example, if the pivot is "responsiveness" and/or "responsive", available documents having been tagged as "responsive" will be analyzed for either predictive phrases or predictive concepts by computing the prediction score for each phrase, and sorting the phrases by prediction score in order to display the phrases smart filter.

A portion of this process includes a step 506 of calculating a predictive value for each of the predictive phrases or predictive concepts relative to the plurality of documents. As referred to above, the calculation can include using a chi-squared statistical calculation or a point pointwise mutual information calculation. Again, the predictive value is indicative of how likely the predictive phrases or predictive concepts are to be associated with documents of the plurality of documents that tagged with the pivot.

In some embodiments, an example calculation includes computing pairwise count matrix $n_{00}$, $n_{01}$, $n_{10}$, $n_{11}$ for all values in a predictive filter over a complete universe (in addition to the regular counts over current search) in a single pass over the universe. The complete universe can include all documents that have been tagged with the selected pivot. Computing a pairwise count can be implemented as a parallel operation by segregating the document sets into boxes.

Next, the pairwise counts are then serialized to a main box and the counts from all boxes are added together to determine the cooccurrence counts that indicates how many of times the predictive phrases or predictive concepts cooccur with the pivot in the selected documents.

Next, a predictive score is computed for each phrase or concept based on the count matrix and then the filter values (phrases or counts) are sorted by predictive score.

In one example calculation, a similarity coefficient is calculated as follows:

$$(n_{00}+n_{11})/n = \text{similarity coefficient}$$

In another example, pointwise mutual information is utilized using the following calculation the following equation:

$$\log(n_{00}/n) - \log(n_0^*/n) - \log(n^*_0/n)$$

The resultant pointwise mutual information calculated can be normalized to the range of −100% to 100% by dividing by a self-information value that is equal to $(-\log(n_{00}/n))$.

In yet another example a chi-squared statistical calculation can include any chi-squared statistical calculation that would be known to one of ordinary skill in the art with the present disclosure before them. In addition, this calculation tests significance against a null hypothesis (same distribution), and also evaluates strength of association indirectly.

Other example calculations include using a Cramér's V where association between two nominal variables is measured. A score is calculated between zero and one. This calculation can be adapted to indicate an inverse association such as "not responsive." This calculation is also chi-square based and includes bias correction. In another example a phi coefficient calculation is utilized that provides a measure of association between two binary variables with a score between zero and one. This calculation can be adapted to indicate an inverse association and for binary provides an output that is similar to Cramér's V (but without bias correction in some instances). Another example calculation includes Goodman and Kruskal's tau measure that determines an asymmetric measure of association.

Each of the calculations above generates what is referred to generally as a predictiveness score. Retuning back to FIG. 5, after utilizing one of the predictive calculations to create a predictiveness score (referred to also as a predictive value), the method includes a step 508 of generating a graphical user interface that comprises automatically generated filter criteria based on the predictive value for each of the predictive phrases or predictive concepts. As noted herein, the predictive value is indicative of how likely a document is to be responsive to the field value (pivot) that is selected.

Next, the method includes a step 510 of receiving a selection of at least one of the automatically generated filter criteria from the graphical user interface. Using the selection the method includes a step 512 of building and applying a filter based on the selection.

In some embodiments, the method includes a step 514 of displaying, within the graphical user interface, documents from the plurality of documents that were selected using the filter. These implementations of GUIs that facilitate these steps are collectively illustrated FIGS. 1-4.

Figure 6:
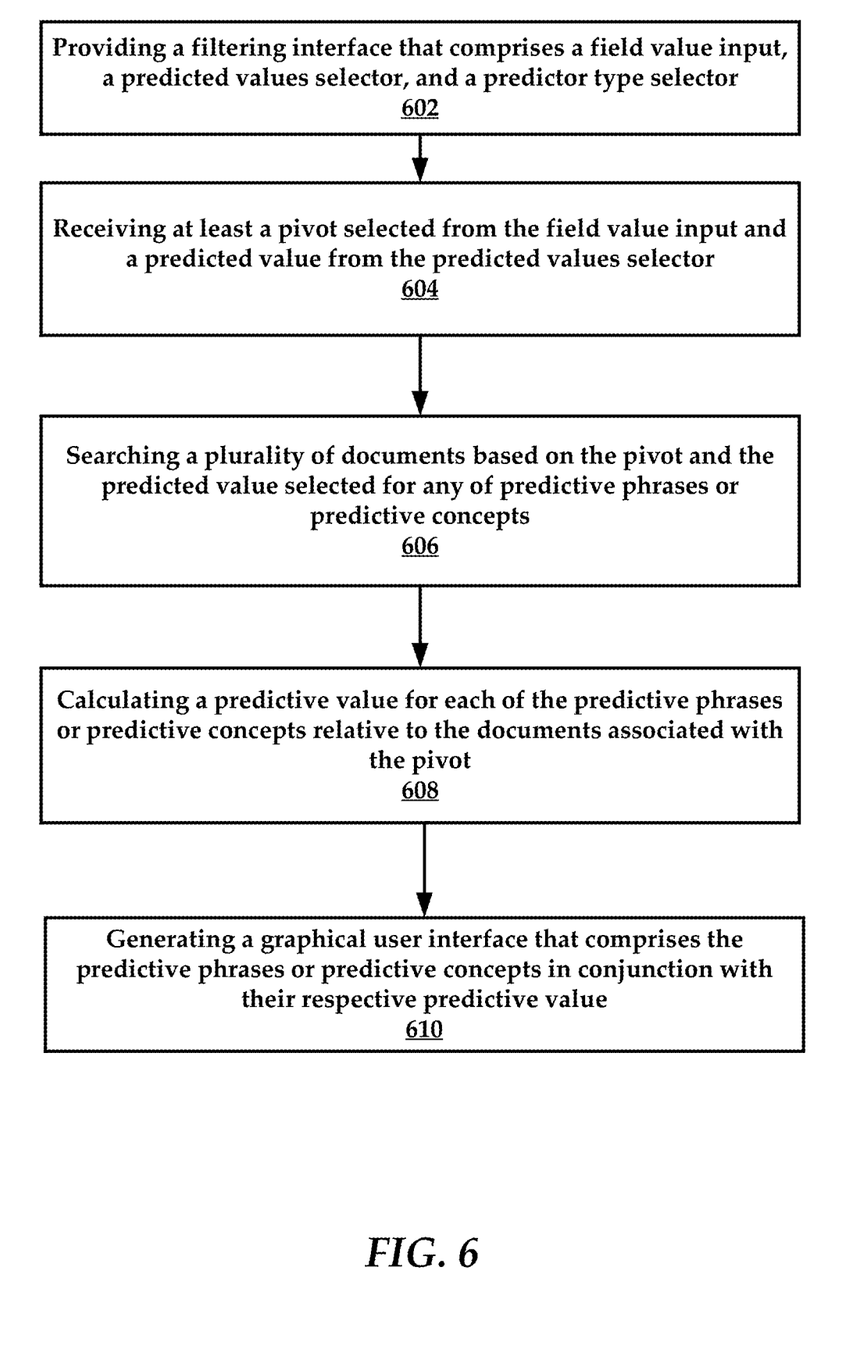
FIG. 6 is a flowchart of another example method for predictive filtering in accordance with the present disclosure.

FIG. 6 illustrates another example method of predictive filtering of documents. The method includes a step 602 of providing a filtering interface that comprises a field value input, a predicted values selector, and a predictor type selector. An example GUI (filtering interface) is illustrated in FIG. 2. The method also includes a step 604 of receiving at least a pivot selected from the field value input and a predicted value from the predicted values selector. The method then includes a step 606 of searching a plurality of documents based on the pivot and the predicted value selected for any of predictive phrases or predictive concepts.

Some embodiments include a step 608 of calculating a predictive value for each of the predictive phrases or predictive concepts relative to the documents associated with the pivot. In various embodiments, the method includes a step 610 of generating a graphical user interface that comprises the predictive phrases or predictive concepts in conjunction with their respective predictive value.

Figure 7:
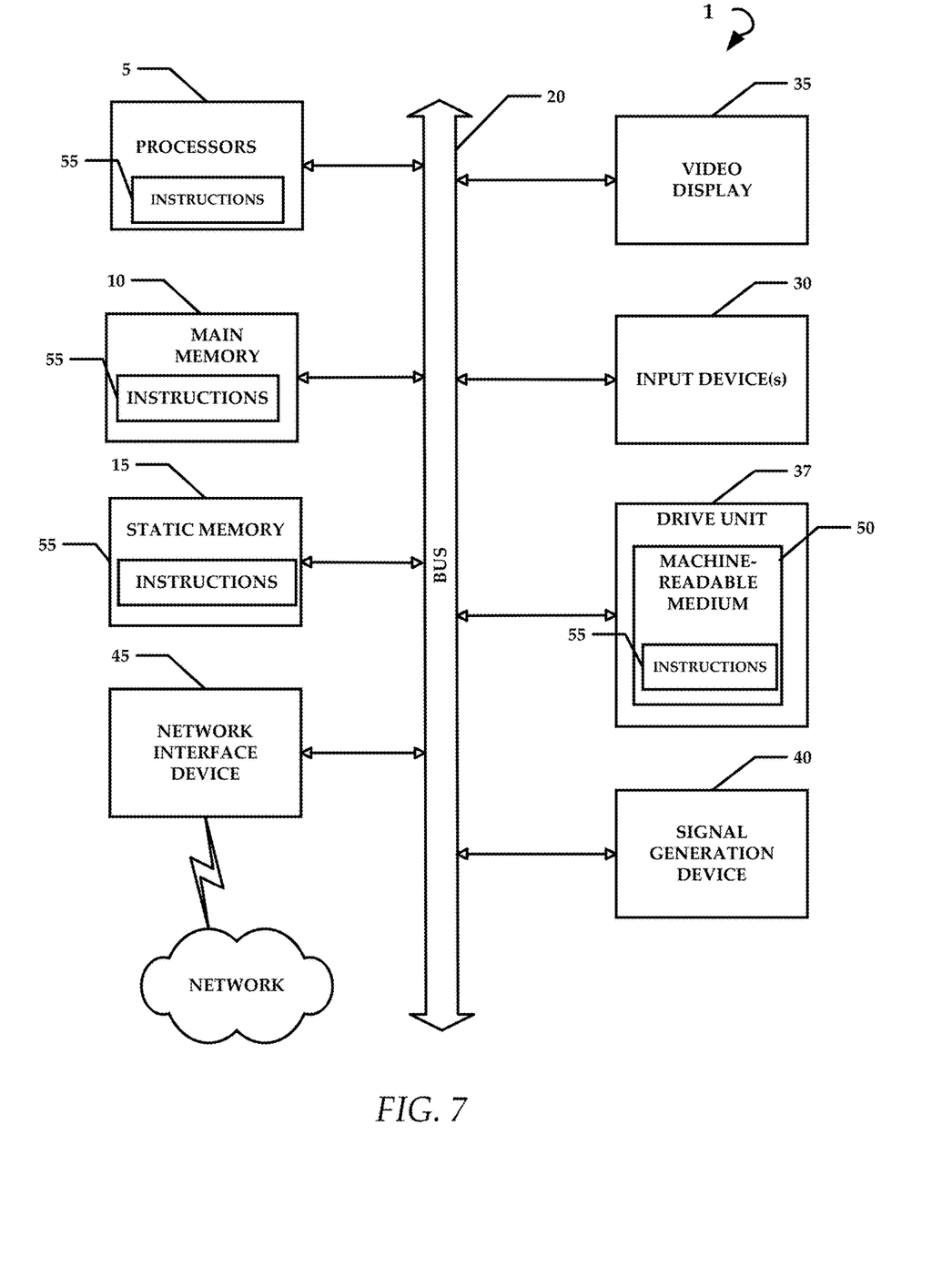
FIG. 7 is a schematic diagram of an example computer device that can be utilized to implement aspects of the present technology.

FIG. 7 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be, for example, a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within static memory 15 and/or within the processors 5 during execution thereof by the computer system 1. The main memory 10, static memory 15, and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as Input/Output (I/O) devices (e.g., input device(s) 30). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure. For example, the technology is not limited to use for stopping email threats, but applies to any messaging threats including email, social media, instant messaging, and chat.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method, comprising:
   receiving a plurality of documents;
   receiving a selection of a pivot, the pivot being a field value or a set of field values for the plurality of documents;
   generating a prediction of responsive phrases, responsive concepts, or other meta-data, the prediction based at least in part of evaluating the plurality of documents based on the pivot, the pivot serving as an input for the generating of the prediction of the responsive phrases, the responsive concepts, or the other meta-data;
   further evaluating the plurality of documents based on a new pivot, the new pivot being one of the predicted responsive phrases or the predicted responsive concepts;
   generating a prediction of other responsive phrases or other responsive concepts;
   calculating a predictive value for each of the other predicted responsive phrases or the other predicted responsive concepts, the predictive value being indicative of a likelihood that the other predicted responsive phrases or the other predicted responsive concepts are to be associated with documents of the plurality of documents that are tagged with the pivot;
   generating a graphical user interface that comprises automatically generated filter criteria based on the predictive value for each of the other predicted responsive phrases, the other predicted responsive concepts, or the other predicted meta-data, the automatically generated filter criteria being based on key phrases identified in a preview frame of the graphical user interface, the key phrases comprising selectable filter parameters;
   receiving a selection of at least one of the filter criteria from the graphical user interface;
   building and applying a filter based on the selection; and
   displaying within the graphical user interface, documents from the plurality of documents that were selected, using the at least one of the filter criteria.

2. The method according to claim 1, wherein calculating the predictive value for each of the other predicted responsive phrases or the other predicted responsive concepts comprises using any of chi-squared statistic or pointwise mutual information.

3. The method according to claim 1, wherein the pivot is updated.

4. The method according to claim 1, wherein the plurality of documents have been tagged with field values.

5. The method according to claim 1, further comprising building a predictive filter, wherein building the predictive filter comprises generating and displaying a filtering interface that comprises a field value input, a predicted values selector, and a predictor type selector.

6. The method according to claim 5, wherein the filtering interface further comprises a preview panel that comprises a summary comprising the predictive value for each of the predicted responsive phrases or the predicted responsive concepts identified.

7. The method according to claim 6, wherein the predicted responsive phrases or the predicted responsive concepts are ranked within the graphical user interface according to their respective predictive value.

8. The method according to claim 7, wherein each of the predicted responsive phrases or the predicted responsive concepts are associated with a frequency count value that indicates how many times the predicted responsive phrases or the predicted responsive concepts appear in the plurality of documents.

9. The method according to claim 8, wherein the frequency count value is displayed next to the predictive value for each of the predicted responsive phrases or the predicted responsive concepts.

10. The method of claim 1, wherein the pivot and the new pivot are picked by a user.

11. The method of claim 1, further comprising computing a predictive score for each of the predicted responsive phrases or predicted responsive concepts based on a pair wise count matrix.

12. The method of claim 11, wherein computing the predictive score for each of the predicted responsive phrases or the predicted responsive concepts based on the pair wise count matrix is performed in a single pass over the plurality of documents that are tagged with the pivot.

13. The method according to claim 1, further comprising computing a similarity score for one or more of the plurality of documents, based on the pivot, against documents that have been previously tagged.

14. A system, comprising:
a processor; and
a memory for storing executable instructions, the processor executing the instructions to:
receive a plurality of documents;
receive a selection of a pivot, the pivot being a field value or a set of field values for the plurality of documents;
generate a prediction of responsive phrases, responsive concepts, or other meta-data, the prediction based at least in part of evaluating the plurality of documents based on the pivot, the pivot serving as an input for the generating of the prediction of the responsive phrases, the responsive concepts, or the other meta-data;
further evaluate the plurality of documents based on a new pivot, the new pivot being one of the predicted responsive phrases or the predicted responsive concepts;
generate a prediction of other responsive phrases or other responsive concepts;
calculate a predictive value for each of the other predicted responsive phrases or the other predicted responsive concepts, the predictive value being indicative of a likelihood that the other predicted responsive phrases or the other predicted responsive concepts are to be associated with documents of the plurality of documents that are tagged with the pivot;
generate a graphical user interface that comprises automatically generated filter criteria based on the predictive value for each of the other predicted responsive phrases, the other predicted responsive concepts, or the other predicted meta-data, the automatically generated filter criteria being based on key phrases identified in a preview frame of the graphical user interface, the key phrases comprising selectable filter parameters;
receive a selection of at least one of the filter criteria from the graphical user interface;
build and apply the filter based on the selection; and
display within the graphical user interface, documents from the plurality of documents that were selected, using the at least one of the filter criteria.

15. The system according to claim 14, wherein the processor further executes the instructions to receive a selection of at least one of the predicted responsive phrases or the predicted responsive concepts from the graphical user interface.

16. The system according to claim 15, wherein the processor further executes the instructions to build and apply a predictive filter based on the selection.

17. The system according to claim 16, wherein the processor further executes the instructions to display, within the graphical user interface, documents from the plurality of documents that were selected using the predictive filter.

18. The system according to claim 17, wherein the processor further executes the instructions to update the pivot with a selection and the predictive filter is rebuilt, the rebuilt filter identifying additional documents found in an updated search using the rebuilt filter.

19. The system according to claim 18, wherein the processor further executes the instructions to generate and display a filtering interface that comprises a field value input, a predicted values selector, and a predictor type selector.

20. The system according to claim 19, wherein the filtering interface further comprises a preview panel that comprises a summary comprising the predictive value for each of the predicted responsive phrases or the predicted responsive concepts identified.

21. The system according to claim 20, wherein the predicted responsive phrases or the predicted responsive concepts are ranked by the system within the graphical user interface according to their respective predictive value.

22. The system according to claim 21, wherein each of the predicted responsive phrases or the predicted responsive concepts are associated with a frequency count value that indicates how many times the predicted responsive phrases or the predicted responsive concepts appear in the plurality of documents, the frequency count value is displayed next to the predictive value for each of the predicted responsive phrases or the predicted responsive concepts.

23. The system according to claim 16, wherein the processor further executes the instructions to utilize the filter to exclude documents from the plurality of documents based on the pivot.

24. The system according to claim 14, wherein the processor further executes the instructions to compute a predictive score for each of the predicted responsive phrases or the predicted responsive concepts based on a pair wise count matrix.

25. The system according to claim 24, wherein computing the predictive score for each of the predicted responsive phrases or the predicted responsive concepts based on the pair wise count matrix is performed in a single pass over the plurality of documents that are tagged with the pivot.

26. The system according to claim 14, wherein the processor further executes the instructions to compute a similarity score for one or more of the plurality of documents, based on the pivot, against documents that have been previously tagged.

* * * * *